Patented Aug. 4, 1936

2,050,089

UNITED STATES PATENT OFFICE 2,050,089

HEAT INSULATION TREATING AND BINDING COMPOUND

James P. Doyle, Santa Cruz, Calif., assignor of one-half to Ernest E. Westergreen, Oakland, Calif.

No Drawing. Application July 5, 1933, Serial No. 679,082

3 Claims. (Cl. 134—23.4)

The invention relates to a compound for treating heat insulation material, such as felt, to retain its effectiveness and for facilitating its application and retention in applied position.

As is more or less known, heat insulating materials of the felt variety retain their maximum effectiveness only so long as the material is kept soft and spongy. Exposure of the felt to moisture will ordinarily cause the felt to become brittle and mouldy whereby not only are the insulation qualities thereof impaired but disintegration sets in and soon renders the insulation of no practical value whatever. In the application of felt layers about a heat conduit or the like, it becomes necessary to bind the adjoining layers together. I have found, however, that the use of ordinary pastes or adhesives for binding the layers serves to render the product a most effective anhydrating medium and therefore brings about the early molding of the insulation with the deleterious results aforesaid. It is therefore one of the main objects of the invention to provide a binder for the insulation which will serve on the one hand to effectively hold the layers together in an integral mass, and on the other hand form a sizing for the felt preventing its absorption of moisture and insuring the permanent retention of the felt in a soft, yielding, and life-like state.

Another object of the invention is to provide a compound of the character described which may be made of inexpensive ingredients, and will facilitate the effective wrapping or other mode of application of the insulating material about the object to be heat insulated.

The invention possesses other objects and features of advantage, some of which with the foregoing will be set forth in the following description of the preferred form of the invention. It is to be understood, however, that variation in the mode of effecting the invention as explained in the description may be adopted within the scope of the invention as set forth in the claims.

In a general way the compound of my invention in its preferred embodiment is made up of a relatively large part of a starch paste and a smaller amount of a vegetable gum, both of which are mixed together and with water to provide a solution of certain specific gravity, the solution being arranged for application to the felt, asbestos and other material serving as the heat insulating medium. More specifically, I use as the first mentioned ingredient a quantity of corn paste which when mixed with the gum and water provides an effective medium of holding the different layers of the insulating material together. As a gum for the product I use acacia, or—as it is sometimes called—gum arabic. The acacia on combining with the elements in the compound will, when applied to the fibres of the insulating felt, cause the latter to retain indefinitely all its original softness. At the same time the inclusion of the acacia in the compound will prevent fermentation of the corn paste and render the felt immune from absorbing moisture.

About nine parts by weight of the corn paste are used with one part by weight of commercial acacia, the two being thoroughly admixed and then added to water of a temperature of about 120 degrees Fahrenheit. The corn and acacia are stirred thoroughly in the heated water and the resultant solution is brought to about 14.0° Baumé or to a specific gravity of approximately 1.106. To bring the solution to the specific gravity aforesaid, about 85 parts by weight of water is used, and I have found that by using the preparation with this consistency the felt will absorb the correct amount of acacia and corn paste. If a heavier solution is used the felt cannot ordinarily absorb enough of the ingredients in solution and the result is the formation of air pockets, blisters, and the subsequent peeling. On the other hand if too light a solution is used, the felt will absorb an excessive amount of water and a resultant disintegration will soon set in and render the insulation of no practical benefit.

In applying the compound to a sheet of insulation material, such as a felt of wool or of asbestos, the compound may be put on with a brush just before or during the wrapping of the material around the pipe or other object to be insulated. In most instances a sheet of asbestos material, lightly but thoroughly covered with the compound, is first wrapped around the pipe, and then a sheet of wool felt, heavily covered with the compound, is wound over the covering of the asbestos. The different sheets are each wrapped tightly in place and by reason of the compound are caused, on the subsequent drying of the job, to adhere together and in position as a solid, integral, yet soft, sprongy mass. Preferably a coating of asphalt paint or the like may be applied to the wrapped surface of the insulation—where the insulation is to be exposed to the weather or so forth. In applying the material to the joints and connections of the pipe, narrow strips of the material are soaked in the solution so as to render the same quite pliable and thereby more easily caused to conform with the shape of the part about which the strips are subsequently wrapped.

I claim:

1. A compound for treating and binding together layers of felt or similar heat insulation material comprising a solution formed with approximately nine parts by weight of corn paste, one part by weight of commerical acacia gum, and eighty-five parts by weight of water.

2. A compound for treating and binding together layers of heat insulation material comprising a water solution of, approximately nine parts corn paste, and one part acacia gum, and compounded by first mixing the corn paste and gum and then adding water at 120 degrees F. until the specific gravity of the solution reaches approximately 1.106.

3. A compound for treating and binding together heat insulation material comprising, starch, acacia gum, and water, in the proportions of substantially nine parts starch to one part gum and sufficient water to produce a solution having a specific gravity of approximately 14° Baumé and compounded by mixing the starch, gum and water with the latter heated to approximately 120 degrees F.

JAMES P. DOYLE.